(12) United States Patent
Ahlisch

(10) Patent No.: US 10,958,059 B2
(45) Date of Patent: Mar. 23, 2021

(54) ANTI-GALLOPING AND AEOLIAN VIBRATION DAMPENING CLAMP

(71) Applicant: Walter Ahlisch, Edmonton (CA)

(72) Inventor: Walter Ahlisch, Edmonton (CA)

( * ) Notice: Subject to any disclaimer, the term of this patent is extended or adjusted under 35 U.S.C. 154(b) by 0 days.

(21) Appl. No.: 16/543,177

(22) Filed: Aug. 16, 2019

(65) Prior Publication Data

US 2020/0059078 A1 Feb. 20, 2020

Related U.S. Application Data

(60) Provisional application No. 62/765,030, filed on Aug. 17, 2018.

(51) Int. Cl.
*F16L 3/08* (2006.01)
*H02G 7/14* (2006.01)
*H02G 7/05* (2006.01)

(52) U.S. Cl.
CPC ............... *H02G 7/14* (2013.01); *H02G 7/053* (2013.01)

(58) Field of Classification Search
CPC ... F16L 3/12; F16L 3/1083; F16L 3/08; F16L 3/1016; H02G 7/53; H02G 7/06
See application file for complete search history.

(56) References Cited

U.S. PATENT DOCUMENTS

| | | | | | |
|---|---|---|---|---|---|
| 3,471,176 | A | * | 10/1969 | Gilchrist | F16L 41/06 285/111 |
| 3,716,650 | A | * | 2/1973 | de Mecquenem | H02G 7/12 174/42 |
| 6,892,990 | B2 | * | 5/2005 | Pisczak | H02G 7/053 248/62 |
| 8,282,048 | B2 | * | 10/2012 | Nguyen | F16L 3/1083 248/74.3 |
| 8,439,317 | B2 | * | 5/2013 | Sampson | F16L 3/1083 248/63 |
| 9,948,080 | B2 | * | 4/2018 | Bentley | H02G 7/125 |

* cited by examiner

*Primary Examiner* — Amy J. Sterling
(74) *Attorney, Agent, or Firm* — Bennett Jones LLP

(57) ABSTRACT

A clamp for suspending an aerial conductor wire from a transmission tower includes an inner sleeve formed by a pair of sleeve halves which are mated and fastened together to define a cylindrical open-ended conductor bore for compressing the conductor wire, the inner sleeve having outer enlarged ends each forming an opposing shoulder, and an outer sleeve formed by a pair of outer sleeve halves which mate together to define an inner bore which closely fits an outer diameter of the inner sleeve and having a length which fits between the opposing shoulders of the inner sleeve, to permit rotation of but restrict longitudinal movement of the inner sleeve within the outer sleeve, wherein each outer sleeve half each comprises an interlocking assembly which mates with an interlocking assembly on the other half and a mounting tab on an longitudinal edge opposite the interlocking assembly.

5 Claims, 2 Drawing Sheets

ANTI-GALLOPING AND AEOLIAN VIBRATION DAMPENING CLAMP

FIELD OF THE INVENTION

The present invention relates to an anti-galloping and/or Aeolian vibration dampening suspension clamp for aerial conductor wire in power transmission lines.

BACKGROUND OF INVENTION

Conductor wire galloping is a phenomenon observed in aerial transmission lines when high winds blow across the conductor wires. The conductor wires oscillate at a low frequency, typically 0.5 to 1 Hz, and may reach peak to peak amplitudes of 10 feet or more. Conductor wire galloping can damage transmission towers and take down power transmission lines.

Aeolian vibration represents another major cause of fatigue failure of conductor strands and/or items which support or protect the conductor. It involves low amplitude, high frequency and typically occurs in the vertical plane and is caused by steady, moderate winds.

Conventional suspension clamps and spacer dampers clamp onto the conductor wire and suspend it from tower cross arms in such a manner that both longitudinal movement and rotation of the conductor wire is restricted. It is believed that conductor wire galloping may be reduced or eliminated if the suspension clamp would allow rotational movement while still preventing longitudinal movement of the conductor wire.

Conventional clamps use a plurality of fasteners which require manipulation by line workers. Tightening or loosening all of the fasteners to install or remove a clamp can be time-consuming and laborious affair.

Therefore, there is a need in the art for a suspension clamp which mitigates the problems in the prior art.

SUMMARY OF INVENTION

In one aspect, the present invention comprises a clamp for suspending an aerial conductor wire from a transmission tower, the clamp comprising:
(a) an inner sleeve comprising a pair of sleeve halves which are mated and fastened together to define a cylindrical open-ended conductor bore for compressing the conductor wire, wherein the sleeve comprises outer enlarged ends each forming an opposing shoulder;
(b) an outer sleeve comprising two outer sleeve halves which may be mated together to define an inner bore which closely fits an outer diameter of the inner sleeve and having a length which fits between the opposing shoulders of the inner sleeve, to permit rotation of but restrict longitudinal movement of the inner sleeve within the outer sleeve;
(c) wherein each outer sleeve half each comprises an interlocking assembly which mates with an interlocking assembly on the other half; and
(d) a mounting tab on an longitudinal edge opposite the interlocking assembly.

In some embodiments, each interlocking assembly comprises a finger and a retaining catch along one longitudinal edge, configured such that the finger of one half is retained by the retaining catch of the opposing half when assembled.

BRIEF DESCRIPTION OF DRAWINGS

The invention will now be described by way of an exemplary embodiment with reference to the simplified, diagrammatic, not-to-scale drawings. In the drawings.

DETAILED DESCRIPTION OF EMBODIMENTS OF THE INVENTION

Figure 2:
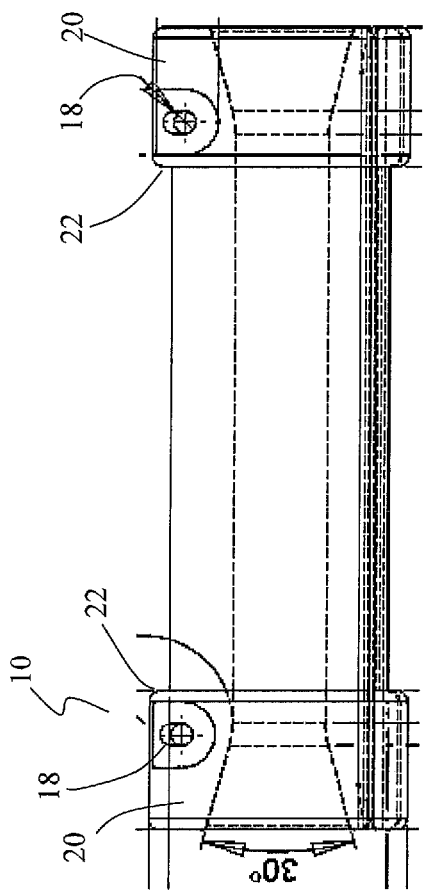
FIG. 2 is a side view of one embodiment of the inner sleeve of the present invention.
Figure 3:
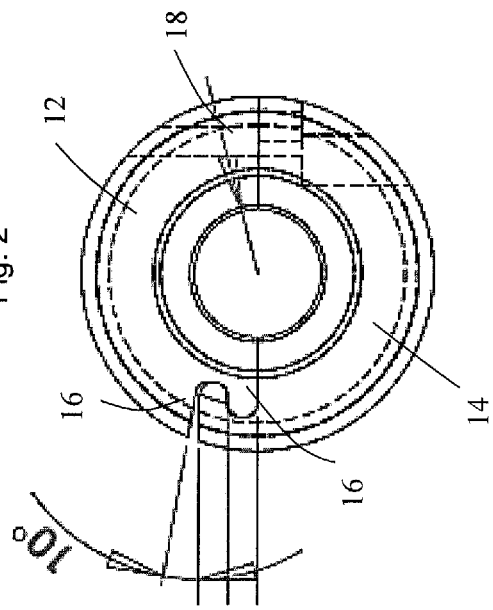
FIG. 3 is an end view of one embodiment of the inner sleeve of the present invention.
Figure 1:
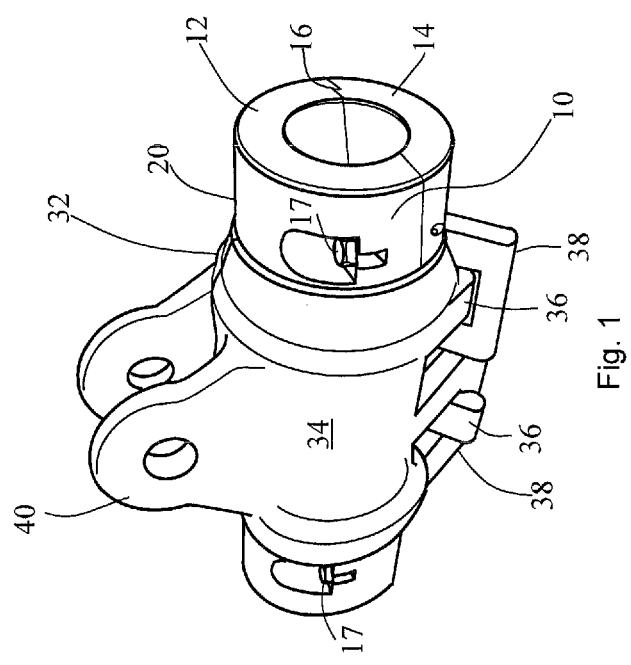
FIG. 1 is a perspective view of one embodiment of the present invention.
Figure 6:
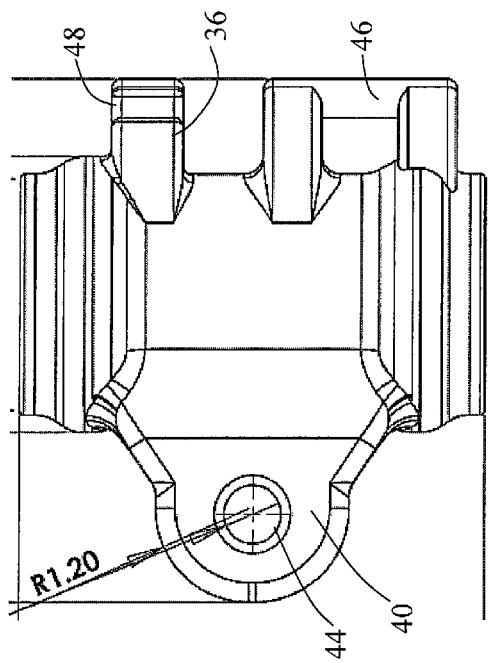
FIG. 6 is a top view of one half of the outer sleeve of the embodiment of FIG. 3.

The present invention relates to a clamp for suspending an aerial conductor wire from a transmission tower. As used herein, the term "longitudinal" means a direction colinear with the path defined by a conductor wire. The term "transverse" means a direction perpendicular to the longitudinal axis.

In some embodiments, the clamp has been configured to minimize the number of parts, and particularly to minimize the number of fasteners required to install the clamp. Furthermore, in some embodiments, the clamp has been configured to tightly clasp onto a conductor wire, but also to yield to a longitudinal pull force and allow the conductor wire to slip with the clamp, rather than cause physical damage to the wire, the clamp or any supporting structures.

Therefore, in one aspect, the invention comprises a clamp comprising an inner sleeve (10) and an outer sleeve (30). The inner sleeve (10) defines a substantially smooth conductor bore which (when installed) tightly engages a conductor wire by slightly compressing the wire within the bore, and is formed from two halves (12, 14), split along a longitudinal plane. The inner sleeve also comprises enlarged outer ends (20) forming a shoulder (22), giving the inner sleeve (10) a "dumbbell" shape. The diameter of the inner bore may taper outwards towards the ends of the inner sleeve to accommodate entry of the conductor wire into the inner bore at a slight angle. In some embodiments, the angle formed may be about 30°.

The two halves of the inner sleeve may each have an interlocking ridge (16) along one edge. A slight gap between the interlocking ridges (16) permit assembly in a hinge-like fashion. Importantly, the interlocking ridges do not interrupt the cylindrical outer surface of the inner sleeve, which permits rotation of the inner sleeve within the outer sleeve. The opposing edge of one half is configured to receive a pair of bolts (17), while the other half has threaded openings (18) into which the bolts may be threaded.

The outer sleeve (30) defines a cylindrical inner bore which closely matches the outer diameter of the inner sleeve (10) such that the inner sleeve may rotate within the outer sleeve (30), but is restrained longitudinally by the shoulders (22) of the enlarged outer ends of the inner sleeve. The outer sleeve is also formed from two halves (32, 34) split along a longitudinal plane. In preferred embodiments, the two halves of the outer sleeve have an interlocking fingers (36) and retaining catches (38) along one edge and mounting tabs (40) along the opposing edge. A single locating nubbin (42) may be provided along the opposing edge along with a mating hole (44), which receives and locates the nubbin (42) when two halves are assembled together. The mounting tabs

Figure 7:
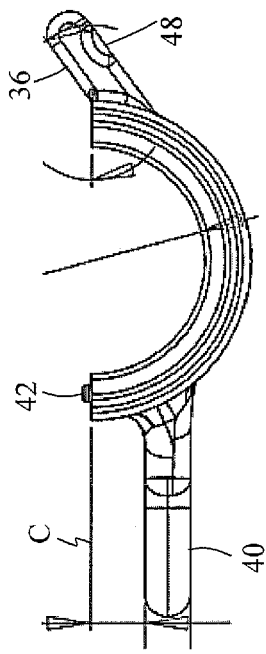
FIG. 7 is an end view of one half of the outer sleeve of the embodiment of FIG. 3.
Figure 5:
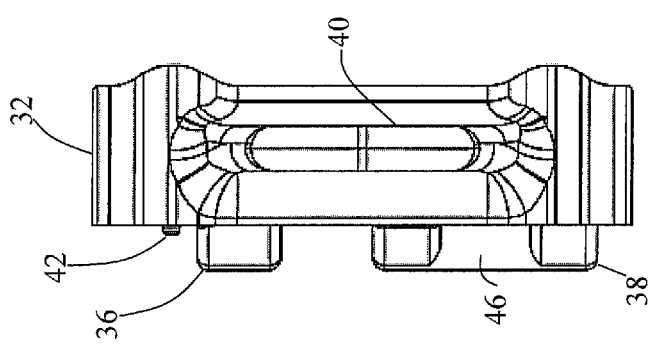
FIG. 5 is a perspective view of one half of the outer sleeve of the embodiment of FIG. 3.
Figure 4:
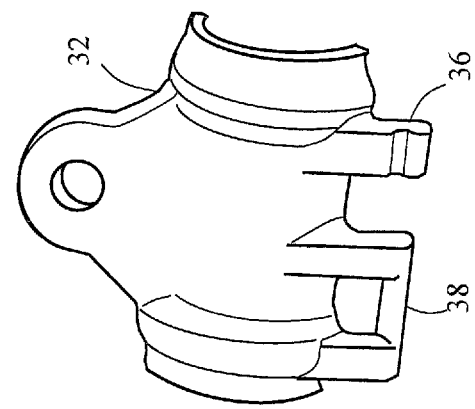
FIG. 4 is a view of the outer sleeve of one embodiment of the suspension clamp of the present invention.

(40) are aligned such that a shackle (not shown) may pass through openings (42) in the mounting tabs. As may be seen in FIG. 7, the mounting tabs may be separated by a gap from the centreline (C). As a result when a curved shackle is used to suspend the clamp, the shackle creates a force which keeps the outer sleeve in a closed position by compressing the mounting tabs towards each other.

In one embodiment, the retaining catch (38) may be a loop with a cross-bar (46). The finger (36) may define a small notch (48) which engages the cross-bar to interlock together.

In some embodiments, the two halves of the outer clamp are identical (not mirror images). As a result, the two halves mate perfectly, such that the finger of one half interlocks with the retaining catch of the other half. In other embodiments, the two halves may be mirror images, with a single element performing both retaining catch and finger functionality to engage the two halves together.

In one embodiment, the conductor bore is sized to firmly clamp a conductor wire, but not so tightly as to be non-moveable. The inner clamp may be configured to allow the conductor wire to slip with a given amount of longitudinal force pulling the conductor wire through the inner clamp.

In one embodiment, the inner and outer clamps are configured to be assembled with a minimum number of fasteners. The inner clamp is assembled with two bolts, one at each end of the clamp. The outer clamp is assembled without fasteners because of the interlocking fingers and catches along one edge, and the mounting tabs at the opposing edge.

In one embodiment, the entire clamp consists of four pieces, two of which are identical, and two bolts, simplifying manufacture, assembly and disassembly.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

What is claimed is:

1. A clamp for suspending an aerial conductor wire from a transmission tower, the clamp comprising:
    (a) an inner sleeve comprising a pair of sleeve halves which are mated and fastened together to define a cylindrical open-ended conductor bore for compressing the conductor wire, wherein the sleeve comprises outer enlarged ends each forming an opposing shoulder;
    (b) an outer sleeve comprising two outer sleeve halves which may be mated together to define an inner bore which closely fits an outer diameter of the inner sleeve and having a length which fits between the opposing shoulders of the inner sleeve, to permit rotation of but restrict longitudinal movement of the inner sleeve within the outer sleeve;
    (c) wherein each outer sleeve half each comprises an interlocking assembly which mates with an interlocking assembly on the other half and a mounting tab on an longitudinal edge opposite the interlocking assembly; and
    (d) wherein the two halves of the outer sleeve are identical or are mirror images of each other.

2. The clamp of claim 1 wherein each interlocking assembly comprises a finger and a retaining catch along one longitudinal edge, configured such that the finger of one half is retained by the retaining catch of the opposing half when assembled.

3. The clamp of claim 1 wherein the outer sleeve is assembled without a fastener apart from the interlocking assembly and mounting tabs.

4. The clamp of claim 1 wherein the conductor bore is defined by a substantially smooth inner surface, configured to clamp a conductor wire up to a maximum pull force, wherein a greater pull force results in slippage of the conductor wire within the bore.

5. The clamp of claim 1 which consists of 4 pieces and 2 bolts.

\* \* \* \* \*